United States Patent
Wood et al.

(10) Patent No.: US 9,628,968 B2
(45) Date of Patent: Apr. 18, 2017

(54) DRIVER NOTIFICATION

(75) Inventors: Andrew Austin Wood, San Diego, CA (US); Algirdas Veitas, Carlsbad, CA (US); Craig Lauer, San Diego, CA (US); Susan Marie Hennenfent, San Diego, CA (US)

(73) Assignee: Omnitracs, LLC, Dallas, TX (US)

( * ) Notice: Subject to any disclaimer, the term of this patent is extended or adjusted under 35 U.S.C. 154(b) by 404 days.

(21) Appl. No.: 11/520,206

(22) Filed: Sep. 12, 2006

(65) Prior Publication Data
US 2008/0064420 A1 Mar. 13, 2008

Related U.S. Application Data

(60) Provisional application No. 60/843,340, filed on Sep. 7, 2006.

(51) Int. Cl.
H04W 4/14 (2009.01)
H04W 4/04 (2009.01)
H04W 4/08 (2009.01)
H04W 4/18 (2009.01)
H04W 88/18 (2009.01)
H04W 92/02 (2009.01)

(52) U.S. Cl.
CPC ........... *H04W 4/14* (2013.01); *H04W 4/04* (2013.01); *H04W 4/08* (2013.01); *H04W 4/18* (2013.01); *H04W 88/184* (2013.01); *H04W 92/02* (2013.01)

(58) Field of Classification Search
CPC ....... H04W 88/184; H04W 4/14; H04W 4/12; H04W 4/18; H04W 88/02
USPC ........................................... 455/466
See application file for complete search history.

(56) References Cited

U.S. PATENT DOCUMENTS

| 5,769,527 | A | * | 6/1998 | Taylor | G05B 19/0421 315/316 |
| 6,335,963 | B1 | * | 1/2002 | Bosco | 379/88.12 |
| 6,970,719 | B1 | * | 11/2005 | McConnell et al. | 455/554.1 |
| 7,409,428 | B1 | * | 8/2008 | Brabec et al. | 709/206 |
| 7,720,056 | B1 | * | 5/2010 | Lohtia | H04L 51/38 370/389 |
| 2004/0243719 | A1 | * | 12/2004 | Roselinsky | 709/245 |

(Continued)

FOREIGN PATENT DOCUMENTS

| WO | 9965256 | 12/1999 |
| WO | 2006058116 | 6/2006 |
| WO | WO 2006058116 A1 * | 6/2006 |

OTHER PUBLICATIONS

QUALCOMM, "Driver Notification Service for Transportation," Feb. 2007, pp. 1-2. Qualcomm Wireless Business Solutions, San Diego, California, USA, XP002465186.

(Continued)

*Primary Examiner* — George Eng
*Assistant Examiner* — Jing Gao
(74) *Attorney, Agent, or Firm* — Arent Fox LLP

(57) ABSTRACT

A method and apparatus for copying a message sent to a vehicle and routing the copied message to the vehicle driver's mobile phone. Through a driver notification application, the copied message can contain driver identification or driver phone number information that is evaluated and confirmed for forwarding the copied message. The copied message is formatted and is sent to the driver's mobile phone via short message service (SMS).

18 Claims, 2 Drawing Sheets

(56) References Cited

U.S. PATENT DOCUMENTS

2006/0059229 A1* 3/2006 Bain .................. G01C 21/26
709/205
2006/0069664 A1* 3/2006 Ling et al. .................. 707/1
2007/0024440 A1* 2/2007 Moran et al. ............ 340/539.13

OTHER PUBLICATIONS

International Search Report, PCT/US07/078192, International Search Authority, European Patent Office, Feb. 20, 2008.
Written Opinion, PCT/US07/078192, International Searching Authority, European Patent Office, Feb. 20, 2008.

\* cited by examiner

DRIVER NOTIFICATION

BACKGROUND OF THE INVENTION

Field of the Invention (Technical Field)

The invention relates to communication systems and more particularly to a method and apparatus for delivering a single customer created message to a plurality of remote receivers.

Background Art

Presently motor carriers use a system such as OmniExpress® or OmniTRACS® to communicate between dispatchers and drivers. The receiving equipment is permanently installed in the motor vehicles. Thus, when a driver is not in the vehicle the communication is not reviewed. This result may have disastrous results, especially if the message is urgent or requires immediate attention. Further, dispatchers are then required to send the message multiple times until the driver reviews the message in his vehicle or calls the driver on a mobile phone. Therefore, there is a need to have a communication system that transmits a single customer created message to more than one remote receiver.

SUMMARY OF THE INVENTION
(DISCLOSURE OF THE INVENTION)

This invention provides embodiments of a method and apparatus for simultaneously sending messages to core communications devices such as OmniTRACS® and OmniExpress® units as well as alternative wireless devices such as mobile phones. During the setup process, the apparatus identifies which message types it would like to enable for the service. Subsequently, each time the targeted driver notification (DN) enabled message is sent to a particular Omni unit, the message is processed by the DN system and sent via short message service (SMS) to the associated wireless device. The association of Omni unit and wireless device occurs using one of the following two methods: 1) the original message contains the mobile phone number (MDN) of the targeted mobile phone or 2) an Omni unit/MDN mapping file is created as part of the setup process.

The message(s) sent to the wireless device can be presented in a number of formats. The SMS message can contain various character quantities of the original message, a canned message or a uniform resource locator (URL), which when selected, starts up a wireless application protocol (WAP) or hyper text markup language (HTML) browser on the phone and displays the entire content of the original message. The message format options are configured using the DN web portal. The DN web portal is used by the DN administrator to manage customer settings, manage end user settings and troubleshoot the system. The customers also use the DN web portal and have access to a subset of the functionality available to the DN administrator. Adding and managing end users is the primary DN web portal activity utilized by users.

The object of the present invention is to deliver a customer created message to more than one receiver.

A primary advantage of the present invention is that motor carriers will maximize their messaging efficiency and realize lower operational costs.

Another advantage of the present invention is that drivers do not have to worry about missing important messages while away from their truck Yet another advantage of the present invention is that the system allows customers to subscribe their drivers to the service without relying on any specific service provider.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

Figure 1:
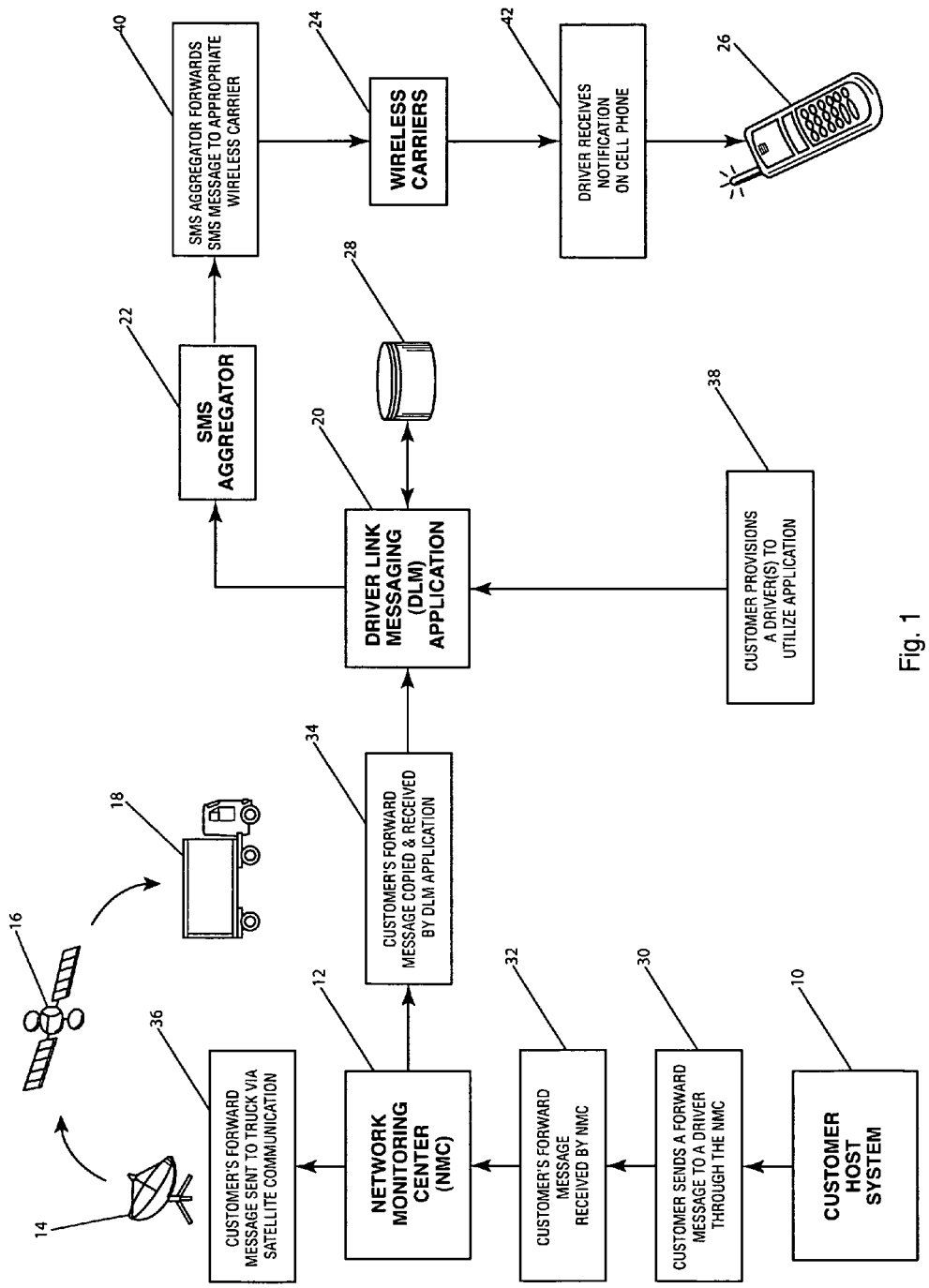
FIG. 1 is a diagram that depicts the system components and process.

FIG. 1 depicts the system components and process. A dispatch center with a computer 10 has message sending capabilities. A message is generated from dispatch center computer 10 and sent to a network monitoring center (NMC) 12. The message is forwarded to a transmitter 14 to a satellite 16 or the like, and forwarded to vehicle 18 for review, using a system such as Qualcomm's Omni systems. The message is also copied and sent to a driver notification (DN) application 20 from NMC 12. DN application 20 performs several functions such as, identification and discrimination to send the copied message to short message service (SMS) aggregator 22, forwarded to a wireless carrier 24 and sent to the drivers short message service (SMS) communication apparatus, such as a mobile phone 26. Thus, the message is sent through the Omni system and also to the driver's mobile phone 26. Although this disclosure refers to a mobile phone, all types of SMS communication apparatuses can be used, including pagers, Blackberry® type devices and the like.

The process begins when a customer sends a forward message 30 targeted to a driver in an associated truck 18. This forward message is sent 30 from the customer's computer 10 using a QTracs Host System, or the like, to a NMC 12. Once NMC 12 receives the forward message 32, it performs two operations: First is to make a copy of the forward message and route 34 it to DN 20, and, second is to route this message to the driver's truck via a message path 36 such as a satellite or CDMA network. Although a satellite system is shown and described, this disclosure is meant to include all communication systems such as, but not limited to, terrestrial CDMA systems or water communication systems.

The Driver Notification Application containing a similar message sent via the QTracs Host System, or the like, delivered to the driver's mobile phone 26 is the new feature in this application. Once the message is routed via message path 36 to a satellite or CMDA to the DN application 20, it is there where the present embodiment differentiates from the prior art. The functionality provided by DN application 20 allows drivers to be located away from their trucks, 18 but still be notified that important messages are awaiting them at the truck 18.

In order for a driver to be enabled for the DN 20 functionality, an end-user representing the driver's company must provision the driver via a web-based application 38 over the internet (DN Portal), or the like. The end-user provides all of the necessary details required so that messages originating from the customer dispatch system or computer 10 can be sent to the driver's phone 26 via short message service (SMS). These details are stored in a relational database 28 for future reference. One of the attributes that can be stored in the database 28 that is associated to a driver is the unique identifier of the mobile unit that resides in the driver's truck 18. This attribute is contained with every message that is sent to the DN 20 application and as such can be cross-referenced to the driver's phone number. This optional mapping allows end users flexibility when setting up their dispatch systems, giving them the choice to embed the driver phone number in the message or providing the unique identifier to driver phone number mapping using the web interface. Once the provisioning process has been completed, the driver is enabled to use the functionality provided. In addition, a customer must specify a SMS policy which specifies what the contents of the SMS message will be for all drivers, a specified number of identified driver's or a single driver. As an example, the customer may choose a custom message (i.e. "You have a Load Assignment waiting at the truck") or a specified number of characters from the actual macro message originally sent by the dispatch software. The number of characters is configurable via the DN Portal.

Figure 2:
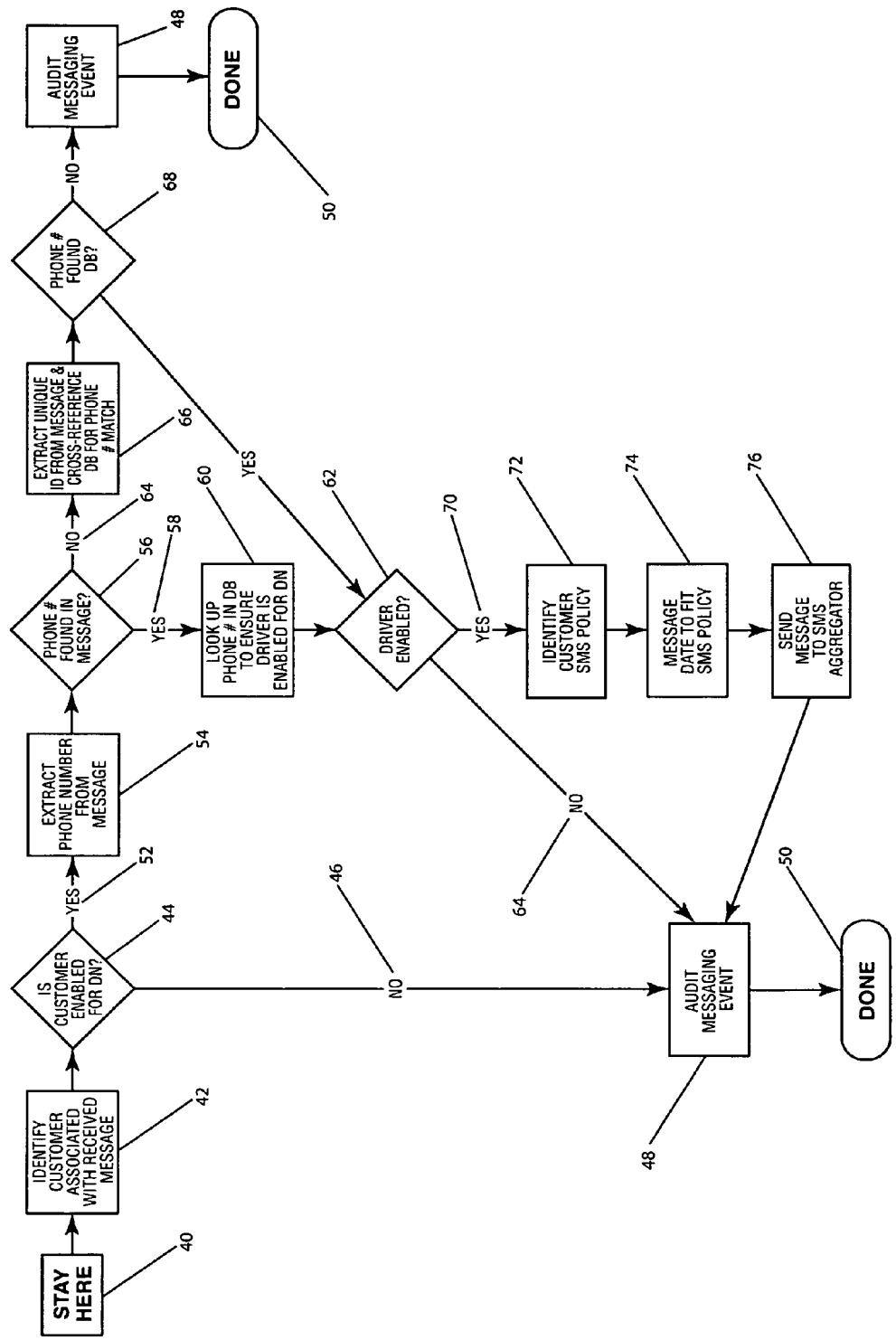
FIG. 2 is a flow chart showing the processes in the driver notification application.

Once a forward message is routed to the DN 20 application, DN 20 application can perform the following steps to successfully route the message to a driver's phone:

FIG. 2 is a flow chart showing the steps of the DN application and is described in conjunction with FIG. 1. The process beings at start 40 which initiates the DN process. Initially, the customer is associated with the received message 42. Next, a check is made to determine whether the customer is enabled for the DN application 44. If the customer is not enabled 46, the process continues to the audit messaging step 48 and the process ends 50. If the customer is enabled 52, the next step is to introspect the contents of the message. The logic will look for a certain pattern of characters that identify the start of the phone number where the message should be sent via SMS. Once the boundaries of the target character pattern have been identified, the phone number is then extracted 54 by grabbing the next 10 characters assumed to be the phone number, or a similar technique. The target character pattern can be any characters that are registered in the database 28.

If the phone number is found 56 and extracted properly 58, the phone number found in the message is then checked 60 to have a match in the relational database 28. If there is a match and the driver is enabled 62, the process of sending the SMS message continues. If there is a match but the driver has been flagged as disabled 64, the process continues to audit messaging event 48 and terminates 50. If the phone number is not found in the message 64, a unique identifier from the proprietary protocol is extracted from the message received. This unique identifier is then looked up in the relational database 28 to see if there is a match to a driver's phone number 66. If the phone number is matched or found in the database 68 and the driver is enabled 62, the process continues, otherwise the process terminates 50 as previously described.

Once it is determined affirmatively that the driver is enabled 70, the customers SMS policy is identified 72. Depending on the customer's choice of SMS Policy the original contents of the message may be massaged 74 in order to provide as much relevant information onto the driver's phone 26 as required. If the SMS Policy is set to send a certain amount of characters of the actual message, extraneous white-space characters are removed and the message may be shortened to fit the length specified. If the SMS Policy is set to a custom message, that custom message is retrieved from the relational database. The custom message is configurable and is drafted by the customer via the DN Portal.

Once the message to be sent has been identified, the message is then sent over the internet 76 to an SMS aggregator 22. SMS aggregator 22 provides SMS connectivity to most major wireless carriers 24 around the world. SMS aggregator 22 then routes the message 40 to the target phone 26 where the driver receives the message 42. In this manner, a similar message is sent over the vehicle messaging system, such as OmniTRACS®, and is also sent to the driver's mobile phone, providing additional assurance that the message has been received.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A method of transmitting a message sent to a vehicle via a vehicle communication system and a short message service (SMS) communication apparatus of a user, the method comprising steps of:

receiving the message by a network monitoring center;

determining whether the message includes a SMS communication address by analyzing contents of the message to identify a pattern of characters corresponding to a start of the SMS communication address, wherein the message is to be sent via SMS using the SMS communication address in response to the determination that the message includes the SMS communication address, wherein the SMS communication address corresponds to a telephone number of the SMS communication apparatus;

extracting, from the message, a unique identifier of a mobile unit residing in the vehicle, the unique identifier being extracted from a proprietary protocol used with the message, in response to the determination that the message does not include the SMS communication address associated with the user, wherein the unique identifier uniquely identifies the vehicle in the vehicle communication system;

retrieving, from a relational database, the SMS communication address associated with the SMS communication apparatus of the user based on the unique identifier matching a driver telephone number in the relational database;

translating the message into a customer selected message in an SMS format based on the unique identifier and a customer specified SMS policy, wherein the SMS policy modifies a content of the message for a specified number of identified mobile SMS communication apparatuses; and transmitting the customer selected message via a wireless carrier to the SMS communication apparatus of the user using the SMS communication address.

2. The method of claim 1, wherein the customer selected message comprises a member from the group consisting of a, canned message, a predetermined number of macro characters, and an entire macro message content.

3. The method of claim 1 further comprising a step of authenticating a user's identification.

4. The method of claim 1 further comprising a step of enabling the transmission of the message to predetermined mobile SMS communication apparatuses.

5. The method of claim 1 further comprising a step of managing and editing a user's configuration.

6. The method of claim 5 wherein the step of managing and editing comprises at least one member from the group consisting of adding users, editing a user's telephone number, editing a user's SMS communication apparatus address, enabling a user's service, and disabling a user's service.

7. The method of claim 1 further comprising a step of auditing the transmission of the short message service message.

8. The method of claim 1, wherein the SMS policy specifies the content to include a custom message.

9. The method of claim 1, wherein the SMS policy specifies the content to include a specified number of characters from the message.

10. An apparatus for transmitting a message sent to a vehicle via a vehicle communication system and a short message service (SMS) communication apparatus of a user, the apparatus comprising:

a network monitoring center for receiving the message;
a driver notification application for:
determining whether the message includes a SMS communication address by analyzing contents of the message to identify a pattern of characters corresponding to a start of the SMS communication address, wherein the message is to be sent via SMS using the SMS communication address in response to the determination that the message includes the SMS communication address, wherein the SMS communication address corresponds to a telephone number of the SMS communication apparatus, extracting, from the message, a unique identifier of a mobile unit residing in the vehicle, the unique identifier being extracted from a proprietary protocol used with the message, in response to the determination that the message does not include the SMS communication address associated with the user, wherein the unique identifier uniquely identifies the vehicle in the vehicle communication system;

retrieving, from a relational database, the SMS communication address associated with the SMS communication apparatus of the user based on the unique identifier matching a driver telephone number in the relational database, and translating the message into a customer selected message in an SMS format based on the unique identifier and a customer specified SMS policy, wherein the SMS policy modifies a content of the message for a specified number of identified mobile SMS communication apparatuses; and a transmitter for sending the customer selected message to the SMS communication apparatus of the user using the SMS communication address.

11. The apparatus of claim 10, wherein the SMS communication address comprises a telephone number.

12. The apparatus of claim 10, wherein the customer selected message comprises a member from the group consisting of a canned message, a predetermined number of macro characters, and an entire macro message content.

13. The apparatus of claim 10 wherein the driver notification application comprises an authenticator for authenticating a user's identification.

14. The apparatus of claim 10, wherein the driver notification application searches the message for the SMS communication address associated with the user.

15. The apparatus of claim 14, wherein the driver notification application searches for the SMS communication address associated with the user based on the unique identifier.

16. The apparatus of claim 10 wherein the driver notification application comprises a manager and editor for managing and editing a user's configuration.

17. The apparatus of claim 10, wherein the SMS policy specifies the content to include a custom message.

18. The apparatus of claim 10, wherein the SMS policy specifies the content to include a specified number of characters from the message.

* * * * *